Dec. 7, 1965

E. H. YONKERS ETAL 3,221,938

POWDER SPRAYING APPARATUS

Filed Dec. 18, 1964

INVENTORS
EDWARD H. YONKERS
SEYMOUR Z. LEWIN
BY

ATTORNEYS

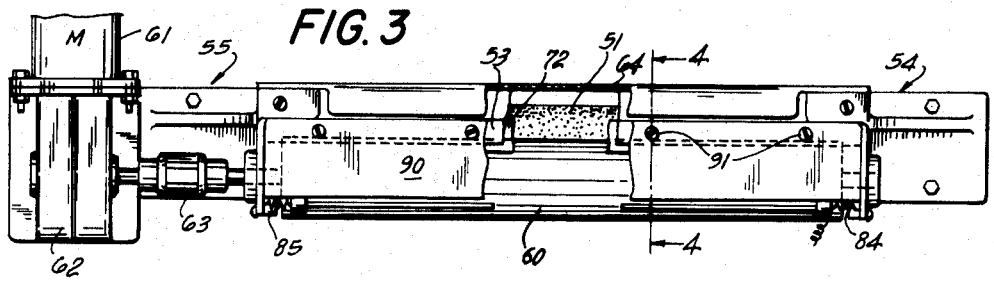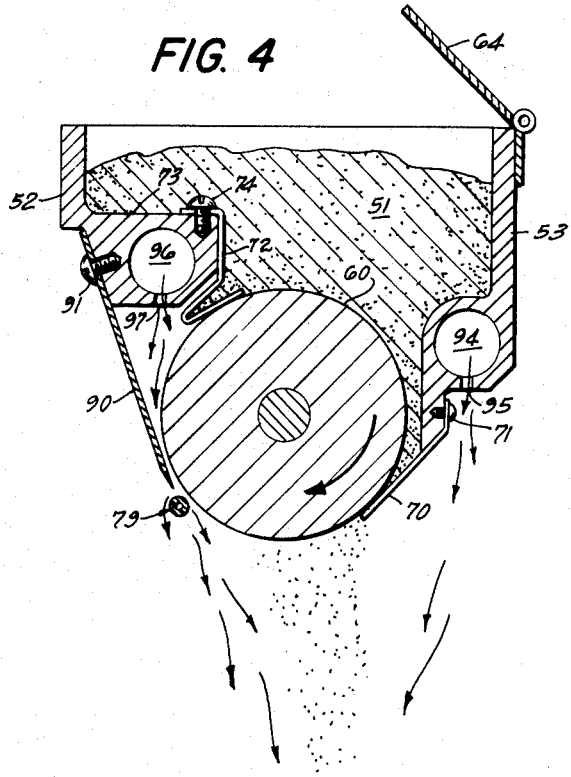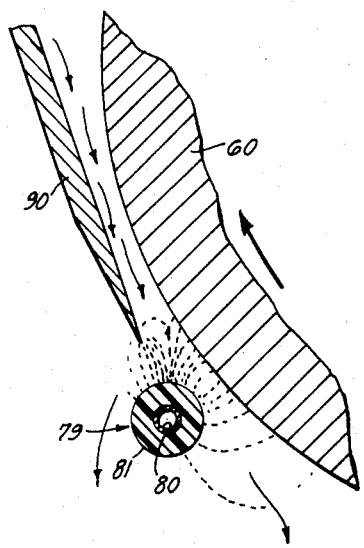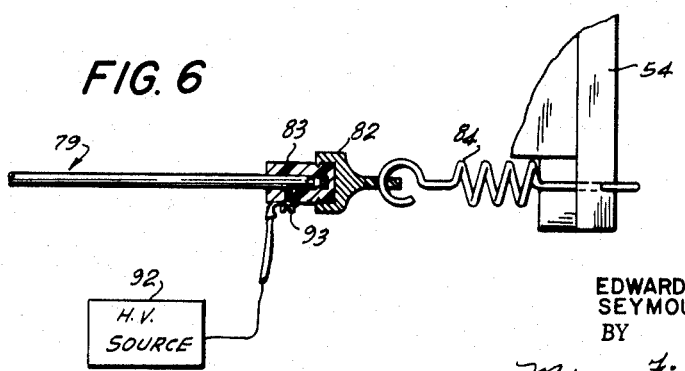
INVENTORS
EDWARD H. YONKERS
SEYMOUR Z. LEWIN
BY
ATTORNEYS

United States Patent Office 3,221,938
Patented Dec. 7, 1965

3,221,938
POWDER SPRAYING APPARATUS
Edward H. Yonkers, Glencoe, Ill., and Seymour Z. Lewin, Bayside, N.Y., assignors to Oxy-Dry Sprayer Corporation, New York, N.Y., a corporation of New York
Filed Dec. 18, 1964, Ser. No. 419,399
12 Claims. (Cl. 222—76)

This invention relates to powder sprayers, and more particularly, to electrostatic apparatus capable of dispensing highly particulate material. While not limited thereto, the invention also relates to dispensing apparatus particularly useful in the distribution of anti-offset material on to freshly printed sheets.

Most of the present day powder dispensing apparatus, particularly as used to dispense anti-offset materials, in essence follows the teachings of Patent No. 2,394,657 issued to Beregh. These units include a powder box for holding the material to be dispensed, a metering mechanism communicating with the powder box and including a dispensing roller in combination with a tangentially wiping blade, and a gas filled tube which is utilized to create an electric field in the vicinity of the dispensing roller.

These gas filled glass tubes, although successfully employed for many years, have several inherent limitations. First, since the tube is constructed from glass it is quite fragile and therefore difficult to handle during shipping and during subsequent use. Second, the outer glass surface tends to pick up oil or grease films and thus tends to become etched due to ion bombardment. As a result, the powder material tends to build up agglomerates on the tube surface which may later fall as chunks of powder. Also, it is difficult to maintain a uniform electrostatic field over the entire length of the tube, and therefore, the distribution of dispensed powder may be somewhat non-uniform.

Thus, it is an object of this invention to provide electrostatic powder dispensing apparatus which does not include a gas filled tube and its disadvantages.

It is another object to provide powder dispensing apparatus constructed to intensify certain portions of the electrostatic field to thereby free particles from the dispensing roller.

It is still another object to provide dispensing apparatus which is constructed to prevent accumulation of powder materials on the electrostatic field generating portion of the system.

The manner in which the foregoing and other objects are achieved in accordance with this invention is set forth more fully in the following specification which provides several illustrative embodiments. The drawings are part of this specification wherein:

FIG. 3 is an elevation view with portions broken away illustrating powder dispensing apparatus in accordance with another embodiment of the invention;

FIG. 4 is a cross-sectional view taken along line 4—4 in FIG. 3;

FIG. 5 is an enlarged drawing showing the details of the electrode structure shown in FIG. 4; and FIG. 6 is a detail drawing illustrating the electrode end structure.

Figure 2:
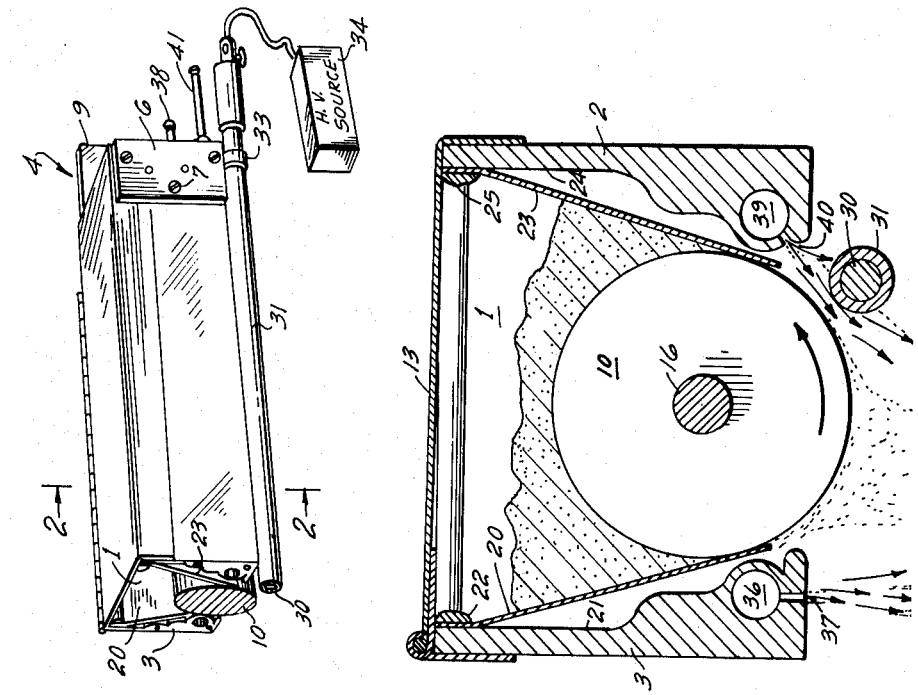
FIG. 2 is a cross-sectional view taken along line 2—2 as indicated in FIG. 1.
Figure 1:
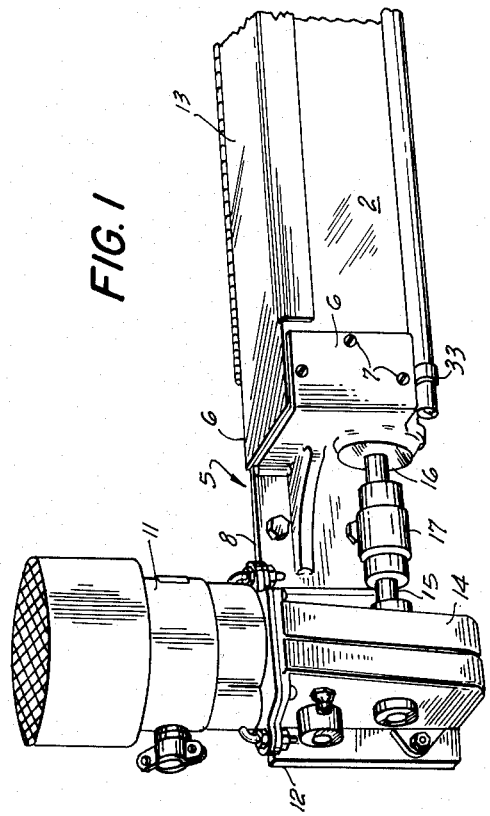
FIG. 1 is a perspective view of powder dispensing apparatus in accordance with one embodiment of the invention.

Referring first to FIGURES 1 and 2, a powder spraying unit in accordance with this invention is shown including a powder box or reservoir 1 defined by a pair of spaced-apart parallel side panels 2 and 3, and a pair of end brackets 4 and 5. The side panels are preferably extruded aluminum panel members and can have any desired cross section which provides a relatively rigid panel, space for an air chamber near the lower surface, and a flat inner vertical surface near the upper edge. The side panels are maintained in their spaced-apart relationship by the end brackets which include flanges 6 secured to the outer surfaces of side panels 2 and 3 by means of screws 7. The end brackets also include flanges 8 and 9 by which the powder spraying unit can be mounted. A cover 13 is secured to the upper edge of side panel 3 by a suitable hinge, and is dimensioned to cover the opening between the side panels.

A dispensing roller 10 is disposed between the lower edges of the side panels and is journaled in end brackets 4 and 5. The dispensing roller is driven by a variable speed electric motor 11 maintained in position by a support structure 12. Also maintained on support structure 12 is a speed reduction unit 14 coupled to the rotating shaft of motor 11. The output shaft 15 of the speed reduction unit is connected to shaft 16 of the dispensing roller by means of a conventional drive coupling 17.

A main wiping blade 20 is secured to the inner vertical surface 21 of side panel 3 and is positioned so that it tangentially engages dispensing roller 10 at a point somewhat below the horizontal center line for the roller. Preferably, the blade is constructed from spring stainless steel and is pre-bent so that the blade is urged against the roller and engages the roller throughout its entire length. As indicated in FIGURE 2, the roller rotates in counter clockwise direction so that wiping blade 20 and roller 10 form the metering mechanism which dispenses powder material from the powder box at a substantially uniform rate. The dispensing roller is a rigid metallic roller having a prepared surface which is preferably roughened by sand blasting or etching to provide a large number of powder carrying cavities. After the surface has been prepared, the roller is preferably chrome plated.

An auxiliary wiping blade 23 is similarly secured to the inner vertical surface 24 of side panel 2 so that it tangentially engages the dispensing roller. This auxiliary wiping blade functions as a seal for the powder box so that the powder material is maintained above the dispensing roller. Wiping blades 20 and 23 can be secured to the side panels in any desired fashion and are preferably backed by rigid securing members 22 and 25 respectively.

A high voltage electrode 30 covered by a dielectric sheath 31 is located in the area beneath wiping blade 23, and is positioned parallel to the dispensing roller. The electrode structure is secured to side panel 2 by means of non-conductive clips 23. The electrode is connected to a suitable 60 cycle high voltage source 34 which provides an A.C. signal in the range between 5000 and 10,000 volts. When the electrode is energized, an alternating electric field is created between the electrode and the dispensing roller which is grounded. This electric field frees powder material which would otherwise tend to cling to the dispensing roller. Also, this alternating electric field tends to disperse the powder particles so that a fairly uniform powder cloud is formed which gradually falls by gravity to the surface below thereby laying down a substantially uniform powder layer.

It has been determined experimentally that desired operating results are achieved if the outside diameter of the dielectric sheath is maintained between one-quarter of an inch and three-quarters of an inch.

The inner electrode 30 can either be a solid rod or a hollow tube and can fit snugly within the sheath or can have a diameter less than the inside diameter of the sheath so that the electrode fits loosely within the sheath. Electrodes constructed from copper, aluminum and brass have been found to perform equally well.

Phenolic resin materials such as phenolformaldehyde resins and polymeric fluorocarbon materials such as polytetrafluoroethylene and trifluorochloroethylene have been found to provide excellent results when used as dielectric materials for dielectric sheath 31. Satisfactory results have also been achieved when using polyolefins such as polyethylene, co-polymers of ethylene and propylene, cellulose derivatives such as cellulose acetate, rubbers both natural and synthetic, glass, alumina refractory or cork.

Each of the side panels is provided with a longitudinal circular cavity which forms a plenum chamber therein. Chamber 36 in side panel 3 communicates with a hose connecting nipple 38 which passes through end bracket 4. Chamber 39 in side panel 2 is similarly connected to a hose connecting nipple 41. A large number of small holes 37 extend upwardly from the lower surface of side panel 3 and communicate with plenum chamber 36. Thus, when air pressure is present in the chamber, an air curtain is created which tends to maintain the dispensed powder material in the area directly below the dispensing roller. A similar array of small holes is placed in side panel 2 communicating with plenum chamber 39, but these holes are slanted so that the air jets are directed toward the space between the dispensing roller and the electrode structure. Therefore, these air jets assist in freeing the powder particles from the dispensing roller and also prevent any accumulation of powder material on the electrode structure.

Another embodiment of the invention is shown in FIGURES 3 through 6 wherein a relatively small diameter electrode structure is employed in combination with an auxiliary electrode which intensifies the electrostatic field. The structure of the powder spraying unit is similar to that previously described and includes a powder box or reservoir 51 defined by a pair of spaced-apart extruded aluminum side panels 52 and 53 and a pair of end brackets 54 and 55. A dispensing roller 60 is journaled in the end brackets and is driven in a clockwise direction by an electric drive motor 61 via a speed reduction unit 62 and a coupling unit 63. A hinged cover 64 is connected to side panel 63 and is dimensioned to cover the opening between the side panels.

The lower portion of side panel 53 is shaped to provide support for main wiping blade 70 which tangentially engages the dispensing roller at a point below the horizontal center line. The wiping blade is constructed from stainless spring steel and is pre-bent so that it is urged toward the roller and engages the roller throughout its entire length. Wiping blade 70 is secured to a vertical surface of side panel 53 by screws 71. Dispensing roller 60 is preferably sand blasted and then chrome plated to provide powder carrying cavities on the surface of the roller. As roller 60 rotates, powder is dispensed from reservoir 51 at a substantially uniform rate and hence roller 60 and wiping blade 70 form the metering mechanism for the powder sprayer.

A second wiping blade 72 is secured to the inside of side panel 52 and is also disposed to tangentially engage the dispensing roller. The function of wiping blade 72 is to provide a seal completing the powder reservoir to thereby retain the powder above the dispensing roller. Side panel 52 projects inwardly to a planar vertical surface located above the roller. Wiping blade 72 lies adjacent this vertical surface and is secured to a horizontal portion 73 of the side panel by means of screws 74.

The electrode structure 79 includes a relatively flexible seamless stainless steel tube 80 of the type often used to make hypodermic needles. This stainless steel electrode is surrounded by a dielectric sheath 81 which may be constructed from one of the materials previously mentioned with respect to electrode 31 in FIG. 2. An end cap 82 is secured to each end of the electrode structure by means of a plastic molded fitting 83. A tension spring 84 connects one end cap to a projection extending downwardly from end bracket 54, and another tension spring 85 similarly connects the other end of the electrode structure to end bracket 55. In this manner the electrode structure is maintained under tension (approximately 100 pounds) so that the electrode is straight and parallel to the dispensing roller surface.

A portion of the outer surface of side panel 52 is slanted toward the dispensing roller to provide a retaining surface for an auxiliary electrode blade 90. This blade is secured to side wall 52 by screws 91 so that the blade is spaced from the roller surface. The lower edge of the auxiliary electrode blade is preferably pointed to thereby provide a knife edge which is located approximately opposite the point of tangency for wiping blade 70. Electrode structure 79 is located slightly below this knife edge.

A high voltage source 92 is connected to the metallic center portion of electrode structure 79 via a pointed set screw 93 which passes through plastic fitting 83 and dielectric sheath 81. The side panels and dispensing roller are grounded as is the high voltage source. When the electrode is energized an electrostatic field is created having a distribution approximately as indicated by the dotted lines in FIGURE 5. It should be noted that the pointed electrode, coupled to the side panel and therefore at ground potential, tends to distort the electrostatic field thereby intensifying the field in certain areas. This intensified field helps free powder particles from the dispensing roller and also helps to disperse the powder particles.

An opening passes longitudinally through side panel 53 to form a plenum chamber 94. A series of small holes 95 are drilled extending downwardly from the plenum chamber to create a series of air jets when the air in the plenum chamber is under pressure. The effect of these jets is the creation of an air curtain which tends to confine the powder material in the area directly beneath the dispensing roller.

A similar longitudinal opening extends through side panel 52 to form plenum chamber 96 located between wiping blade 72 and auxiliary electrode blade 90. A series of holes 97 are drilled extending downwardly from the plenum chamber to thereby create air jets directed toward the electrode structure when the air in the plenum chamber is under pressure. The air flows between electrode blade 90 and dispensing roller 60 and also flows around electrode structure 79. Therefore, this air flow creates a second air curtain for confining the powder material, blows against the dispensing roller surface to free powder particles, and blows against the electrode to prevent accumulation of powder material thereon.

While only a few illustrative embodiments of the invention have been described in detail, it should be obvious that there are an unlimited number of variations within the scope of this invention. The invention is more particularly defined in the appended claims.

What is claimed is:
1. Apparatus for dispensing highly particulate material comprising
   a dispensing roller;
   a pair of wiping blades;
   means including said dispensing roller and said wiping blades for forming a receptacle above said roller for retaining the highly particulate material to be dispensed;
   a metering mechanism including said dispensing roller and one of said wiping blades disposed to tangentially engage said roller so that particulate material is dispensed from said receptacle as said dispensing roller rotates;
   a rigid electrode structure including an elongated metallic electrode disposed in a fixed relation parallel to said dispensing roller and below the other one of said wiping blades;
   a sheath of dielectric material snugly fit surrounding said electrode;

a high potential electric source for energizing said electrode to create an electric field capable of freeing particles from the surface of said dispensing roller and thereafter dispersing the same; and means operatively associated with said electrode structure for preventing accumulation of particulate material thereon.

2. Dispensing apparatus in accordance with claim 1 wherein the outside diameter of said sheath is in the range between one-quarter inch and three-quarters inch.

3. Dispensing apparatus in accordance with claim 1 wherein said dielectric material is a polymeric fluorocarbon material.

4. Dispensing apparatus in accordance with claim 1 wherein said dielectric material is a phenolic resin polymer.

5. Dispensing apparatus in accordance with claim 1 wherein said dielectric material is selected from the group consisting of phenolic resin materials, polymeric fluorocarbon materials, polyolefins, co-polymers of ethylene; co-polymers of propylene, cellulose derivatives, rubbers, glass, alumina refractory and cork.

6. Dispensing apparatus in accordance with claim 1 further comprising an auxiliary electrode member having a sharp edge in proximity with, and parallel to, said electrode and dispensing roller to thereby intensify the electric field in the vicinity of said dispensing roller.

7. Apparatus for dispensing highly particulate material comprising
a dispensing roller;
means forming a receptacle above said dispensing roller for retaining the particulate material to be dispensed;
a wiping blade;
a metering mechanism including said dispensing roller and said wiping blade disposed to tangentially engage said roller so that particulate material is dispensed from said receptacle as said dispensing roller rotates;
an elongated metallic electrode spaced from said wiping blade and disposed parallel to said dispensing roller;
a sheath of dielectric material surrounding said electrode;
a high potential electric source for energizing said electrode to create an electric field for freeing particles from the surface of said dispensing roller and for thereafter dispersing the same; and
pneumatic means for creating an air stream directed toward said sheath to thereby prevent accumulation of particulate material thereon.

8. Dispensing apparatus in accordance with claim 7 further comprising
second pneumatic means disposed adjacent said wiping blade, said first and second pneumatic means being operative to provide downwardly directed air streams thereby creating air curtains which confine the particulate material to a restricted area below said dispensing roller.

9. Apparatus for dispensing highly particulate material comprising
a dispensing roller;
means forming a receptacle above said roller for retaining the particulate material to be dispensed;
a wiping blade;
a metering mechanism including said dispensing roller and said wiping blade disposed to tangentially engage said roller so that particulate material is dispensed from said receptacle as said dispensing roller rotates;
an elongated metallic electrode spaced from said wiping blade and disposed parallel to said dispensing roller;
a bare metallic auxiliary electrode member having a sharp edge in proximity with and parallel to said electrode and said dispensing roller;
a high potential source coupled to said member, said electrode, and said dispensing roller to create an asymmetric electrostatic field which is intensified in certain selected areas, said electrostatic field as intensified being capable of freeing particulate material from said dispensing roller and thereafter dispersing the same.

10. Dispensing apparatus in accordance with claim 9 wherein said elongated electrode is surrounded by a sheath of dielectric material.

11. Dispensing apparatus in accordance with claim 10 further comprising
pneumatic means for creating an air stream directed toward said sheath to thereby prevent accumulation of particulate material thereon.

12. Dispensing apparatus in accordance with claim 11 further comprising
second pneumatic means disposed adjacent said wiping blade, said first and second pneumatic means being operative to provide downwardly directed air streams thereby creating air curtains which confine the particulate material to a restricted area below said dispensing roller.

References Cited by the Applicant

UNITED STATES PATENTS

| | | |
|---|---|---|
| 2,394,657 | 2/1946 | Beregh. |
| 3,053,180 | 9/1962 | Doyle. |
| 3,114,482 | 12/1963 | Dunaway. |

FOREIGN PATENTS

| | | |
|---|---|---|
| 685,478 | 12/1952 | Great Britain. |

LOUIS J. DEMBO, *Primary Examiner.*